United States Patent
Li

(10) Patent No.: US 9,891,648 B2
(45) Date of Patent: Feb. 13, 2018

(54) SWITCHING CONVERTER WITH SMART FREQUENCY GENERATOR AND CONTROL METHOD THEREOF

(71) Applicant: Chengdu Monolithic Power Systems Co., Ltd., Chengdu (CN)

(72) Inventor: Lei Li, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 24 days.

(21) Appl. No.: 14/973,556

(22) Filed: Dec. 17, 2015

(65) Prior Publication Data

US 2016/0187914 A1    Jun. 30, 2016

(30) Foreign Application Priority Data

Dec. 30, 2014  (CN) .......................... 2014 1 0841384

(51) Int. Cl.
  G05F 1/56   (2006.01)
  G05F 3/26   (2006.01)
  H02M 1/14   (2006.01)
  H02M 3/156  (2006.01)
  H02M 1/00   (2006.01)

(52) U.S. Cl.
  CPC ................ G05F 3/26 (2013.01); H02M 1/14 (2013.01); H02M 3/156 (2013.01); *H02M 2001/0009* (2013.01)

(58) Field of Classification Search
  CPC ........................................................ G05F 1/56
  USPC .......................................... 323/282–286, 351
  See application file for complete search history.

(56) References Cited

U.S. PATENT DOCUMENTS 9,008,597 B2 * 4/2015 Levesque ................ H03F 3/193
                                                    323/286
2006/0043953 A1    3/2006  Xu
2012/0286750 A1   11/2012  Xu

* cited by examiner

*Primary Examiner* — Adolf Berhane
*Assistant Examiner* — Nusrat Quddus
(74) *Attorney, Agent, or Firm* — Perkins Coie LLP

(57) ABSTRACT

A control method of a switching converter, wherein the switching converter has a main transistor and is configured to provide an output signal. The control method includes: generating a feedback signal indicative of the output signal of the switching converter; generating a clock signal to determine the switching frequency of the main transistor; generating a control signal to control the main transistor based on the clock signal and the feedback signal; and detecting whether the on-time of the main transistor is smaller than a time threshold based on the control signal. If the on-time of the main transistor is smaller than the time threshold, the frequency of the clock signal will be adjusted to regulate the on-time of the main transistor to be equal to the time threshold.

17 Claims, 8 Drawing Sheets

US 9,891,648 B2

SWITCHING CONVERTER WITH SMART FREQUENCY GENERATOR AND CONTROL METHOD THEREOF

CROSS-REFERENCE TO RELATED APPLICATIONS

This application claims the benefit of CN application 201410841384.X, filed on Dec. 30, 2014 and incorporated herein by reference.

TECHNICAL FIELD

The present invention generally relates to electronic circuits, and more particularly but not exclusively to switching converters.

BACKGROUND

Peak current control method is widely used in switching converters. In peak current control, a reference voltage and a feedback signal which indicates the output voltage of the switching converter are sent into an error amplifier to generate a compensation signal. The main transistor of the switching converter will become on once a clock signal comes, and become off when a current sensing signal indicative of the current flowing through the main transistor hits the compensation signal. Owing to the inherent delay of the control circuit, there exists a minimum on-time, wherein the main transistor can turn off only after its on-time reaches this minimum on time.

If the input voltage of the switching converter keeps increasing, the on-time of the main transistor will decrease until it reaches the minimum on-time. Hereafter, if the input voltage continues rising, the output voltage of the switching voltage will go up and a large ripple would arise accordingly.

SUMMARY

To solve the problem mentioned above, the present invention involves a time threshold which is larger than the minimum on-time. If the on-time of the main transistor becomes smaller than the time threshold, the frequency of the clock signal would be adjusted to regulate the on-time of the main transistor to be equal to the time threshold. By doing so, the on-time of the main transistor would not fall to reach the minimum on-time anymore, thus the voltage ripple potentially caused by the minimum on-time can be fundamentally avoided.

Embodiments of the present invention are directed to a switching converter, comprising: a switching circuit having a main transistor, wherein the switching circuit is configured to convert an input voltage into an output voltage; a feedback circuit coupled to the switching circuit, wherein the feedback circuit is configured to generate a feedback signal indicative of the output voltage; a current sensing circuit configured to sense the current flowing through the main transistor and generate a current sensing signal; a clock generator configured to generate a clock signal; an error amplifying circuit coupled to the feedback circuit, wherein based on the difference between a first reference voltage and the feedback signal, the error amplifying circuit generates a compensation signal; a comparing circuit coupled to the current sensing circuit and the error amplifying circuit, wherein the comparing circuit compares the current sensing signal with the compensation signal and generates a reset signal; and a control circuit coupled to the clock generator and the comparing circuit, wherein based on the clock signal and the reset signal, the control circuit generates a control signal to control the main transistor. The clock generator is coupled to the control circuit to receive the control signal and detect whether the on-time of the main transistor is smaller than a time threshold based on the control signal. If the on-time of the main transistor is smaller than the time threshold, the clock generator will adjust the frequency of the clock signal to regulate the on-time of the main transistor to be equal to the time threshold.

Embodiments of the present invention are also directed to a controller used in a switching converter, wherein the switching converter has a main transistor and is configured to provide an output signal. The controller comprises: a clock generator configured to generate a clock signal to determine the switching frequency of the main transistor; and a control circuit coupled to the clock generator, wherein based on the clock signal and a feedback signal indicative of the output signal of the switching converter, the control circuit generates a control signal to control the main transistor. If the on-time of the main transistor is smaller than a time threshold, the clock generator will adjust the frequency of the clock signal to regulate the on-time of the main transistor to be equal to the time threshold.

Embodiments of the present invention are further directed to a control method of a switching converter, wherein the switching converter has a main transistor and is configured to provide an output signal. The control method comprises: generating a feedback signal indicative of the output signal of the switching converter; generating a clock signal to determine the switching frequency of the main transistor; generating a control signal to control the main transistor based on the clock signal and the feedback signal; detecting whether the on-time of the main transistor is smaller than a time threshold based on the control signal; and if the on-time of the main transistor is smaller than the time threshold, adjusting the frequency of the clock signal to regulate the on-time of the main transistor to be equal to the time threshold.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

To solve the problem mentioned in the background, the present invention sets a time threshold (e.g. 80 ns) larger than the minimum on-time (e.g. 50 ns), and adjusts the frequency of the clock signal when the on-time of the main transistor becomes smaller than the time threshold, so as to regulate the on-time of the main transistor to be equal to the time threshold. Therefore, the on-time of the main transistor would not fall to reach the minimum on-time, and the voltage ripple caused by the minimum on-time can be fundamentally eliminated.

Figure 1:
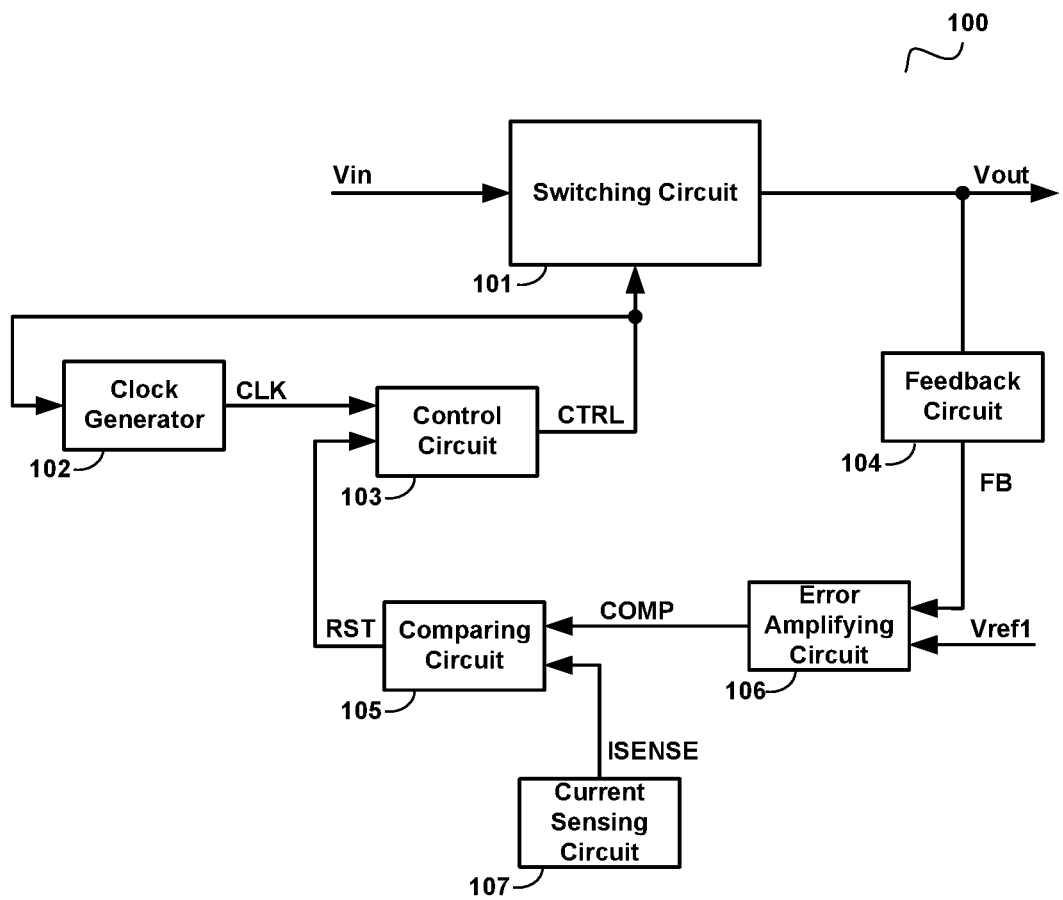
FIG. 1 is a block diagram of a switching converter 100 in accordance with an embodiment of the present invention.

FIG. 1 is a block diagram of a switching converter 100 in accordance with an embodiment of the present invention. The switching converter 100 includes a switching circuit 101, a clock generator 102, a control circuit 103, a feedback circuit 104, a comparing circuit 105, an error amplifying circuit 106 and a current sensing circuit 107. The switching circuit 101 has a main transistor, and is configured to convert an input voltage Vin into an output voltage Vout. The switching circuit 101 can be configured in any suitable topologies, such as BUCK, BOOST, BUCK-BOOST, FLYBACK, etc. The feedback circuit 104 is coupled to the switching circuit 101. It senses an output signal of the switching circuit 101 and generates a feedback signal FB accordingly. The output signal can be the output voltage Vout shown in FIG. 1, or alternatively, the output current or output power of the switching circuit 101.

The error amplifying circuit 106 is coupled to the feedback circuit 104, wherein based on the difference between a reference voltage Vref1 and the feedback signal FB, the error amplifying circuit 106 generates a compensation signal COMP. The current sensing circuit 107 is configured to sense the current flowing through the main transistor and generate a current sensing signal ISENSE. The comparing circuit 105 is coupled to the current sensing circuit 107 and the error amplifying circuit 106, wherein the comparing circuit 105 compares the current sensing signal ISENSE with the compensation signal COMP and generates a reset signal RST. The clock generator 102 is configured to generate a clock signal CLK. The control circuit 103 is coupled to the clock generator 102 and the comparing circuit 105, wherein based on the clock signal CLK and the reset signal RST, the control circuit 103 generates a control signal CTRL to control the main transistor in the switching circuit 101.

As can be seen from FIG. 1, the clock generator 102 is coupled to the control circuit 103 to receive the control signal CTRL. It detects whether the on-time Ton of the main transistor is smaller than a time threshold Tth based on the control signal CTRL. The frequency of the clock signal CLK is normally constant. But if the on-time Ton is smaller than the time threshold Tth, the clock generator 102 will adjust the frequency of the clock signal CLK to regulate the on-time Ton to be equal to the time threshold Tth. Generally, the time threshold Tth is configured to be larger than the minimum on-time of the main transistor.

It is well-known that, under the same load condition, an increase of the clock frequency would cause the on-time Ton to decrease, and vice versa. When the on-time Ton reduces to be smaller than the time threshold Tth due to an increase of the input voltage Vin, the on-time Ton would be regulated to be equal to the time threshold Tth. The regulation of the energy provided to the load is now realized through adjusting the clock frequency, and the voltage ripple potentially caused by the minimum on-time is fundamentally eliminated.

In some embodiments, to prevent misjudgment, the clock generator 102 adjusts the frequency of the clock signal CLK only when the on-time Ton of the main transistor is smaller than the time threshold Tth in a plurality of successive switching cycles.

Figure 2A:
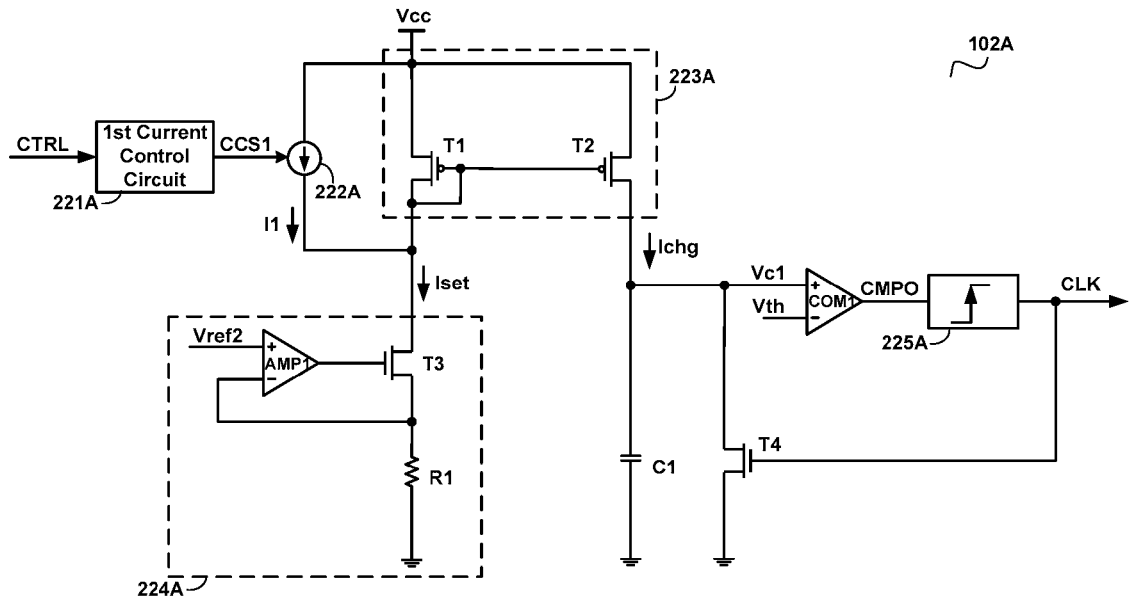
FIG. 2A schematically illustrates a clock generator 102A in accordance with an embodiment of the present invention.

FIG. 2A schematically illustrates a clock generator 102A in accordance with an embodiment of the present invention. The clock generator 102A comprises a first current control circuit 221A, a controllable current source 222A, a current mirror 223A, a frequency setting circuit 224A, a capacitor C1, a transistor T4, a comparator COM1 and a one-shot circuit 225A. The first current control circuit 221A has an input terminal and an output terminal, wherein the input terminal is coupled to the control circuit to receive the control signal CTRL, and wherein based on the control signal CTRL, the first current control circuit 221A detects whether the on-time Ton of the main transistor is smaller than the time threshold Tth, and generates a first current control signal CCS1 at the output terminal. The controllable current source 222A has a first terminal, a second terminal and a control terminal, wherein the first terminal is coupled to a power supply voltage Vcc, the control terminal is coupled to the output terminal of the first current control circuit 221A to receive the first current control signal CCS1, the second terminal is configured to provide a current I1. The frequency setting circuit 224A is configured to provide a setting current Iset. In the embodiment shown in FIG. 2A, the frequency setting circuit 224A includes a transistor T3, a resistor R1 and an operational amplifier AMP1. People skilled in the art can recognize, however, that the frequency setting circuit 224A may be configured in other suitable structures, such as a current source controlled by an external clock signal.

As can be seen from FIG. 2A, the current mirror 223A includes transistors T1 and T2. It has a power supply terminal, a first terminal and a second terminal, wherein the power supply terminal is coupled to the power supply voltage Vcc, the first terminal is coupled to the frequency setting circuit 224A and the second terminal of the controllable current source 222A. The current Ichg provided at the second terminal of the current mirror 223A can be expressed as:

$$I_{chg}=I_{set}-I_1 \qquad (1.1)$$

The capacitor C1 has a first terminal and a second terminal, wherein the first terminal is coupled to the second terminal of the current mirror 223A, the second terminal is coupled to a reference ground. The transistor T4 has a first terminal, a second terminal and a control terminal, wherein the first terminal is coupled to the first terminal of the capacitor C1, the second terminal is coupled to the reference ground. The comparator COM1 has a first input terminal, a second input terminal and an output terminal, wherein the first input terminal is coupled to the first terminal of the capacitor C1, the second input terminal is configured to receive a threshold voltage Vth. The comparator COM1 compares the voltage Vc1 across the capacitor C1 with the threshold voltage Vth and generates a comparison signal CMPO at the output terminal. The one-shot circuit 225A has an input terminal and an output terminal, wherein the input terminal is coupled to the output terminal of the comparator COM1, the output terminal is coupled to the control terminal of the transistor T4 and is configured to provide the clock signal CLK.

Figure 2B:
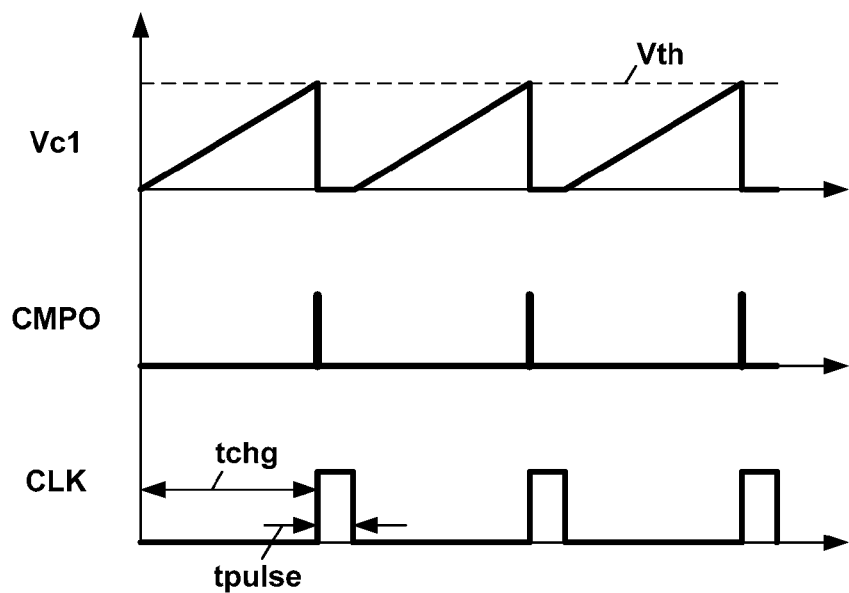
FIG. 2B illustrates working waveforms of the clock generator 102A shown in FIG. 2A in accordance with an embodiment of the present invention.

FIG. 2B illustrates working waveforms of the clock generator 102A in accordance with an embodiment of the present invention. As shown in the figure, when the clock signal CLK is logical low, the transistor T4 is off. The capacitor C1 is charged by the current Ichg and the voltage Vc1 across the capacitor C1 gradually increases. Once the voltage Vc1 increases to reach the threshold voltage Vth, the comparison signal CMPO changes from logical low into logical high. The one-shot circuit 225A is triggered to generate a pulse at the clock signal CLK, so the transistor T4 is turned on for a time period to discharge the capacitor C1.

The frequency fclk of the clock signal CLK can be expressed as:

$$f_{clk} = \frac{1}{t_{chg} + t_{pulse}} = \frac{1}{C_1 \times \frac{V_{th}}{I_{chg}} + t_{pulse}} \quad (1.2)$$

Wherein tchg represents the charge time of the capacitor C1, and tpulse represents the pulse width of the clock signal CLK.

Combing the equations (1.2) and (1.1), we can get:

$$f_{clk} = \frac{1}{C_1 \times \frac{V_{th}}{I_{set} - I_1} + t_{pulse}} \quad (1.3)$$

It is apparent from the equation (1.3) that the clock frequency fclk would be affected by the current I1 which is provided by the controllable current source 222A. The clock frequency fclk decreases when the current I1 increases, and vice versa.

When the on-time Ton of the main transistor is smaller than the time threshold Tth, the current I1 varies under the control of the first current control signal CCS1, so as to regulate the on-time Ton to be equal to the time threshold Tth. On the other side, when the on-time Ton is larger than the time threshold Tth, the current I1 is zero and the clock frequency fclk is a constant value determined by the setting current Iset.

Figure 3:
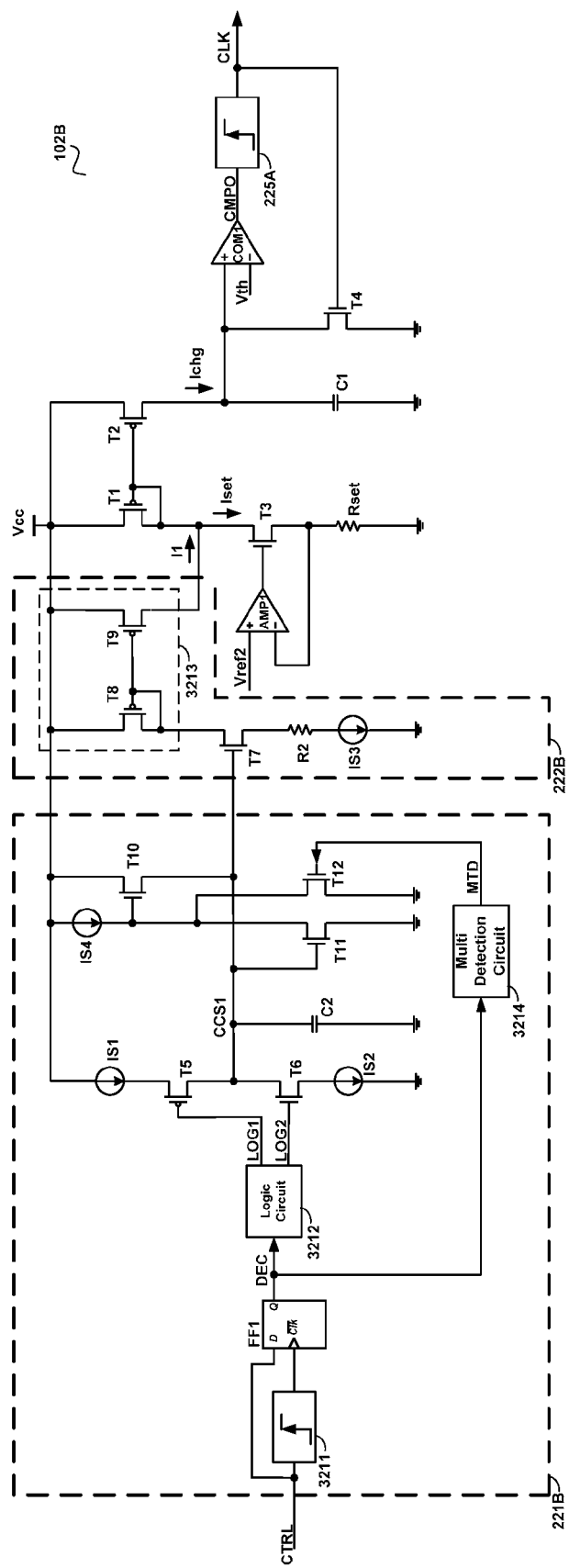
FIG. 3 schematically illustrates a clock generator 102B in accordance with an embodiment of the present invention.

FIG. 3 schematically illustrates a clock generator 102B in accordance with an embodiment of the present invention. As shown in FIG. 3, the first current control circuit 221B comprises a one-shot circuit 3211, a flip-flop FF1, a logic circuit 3212, current source IS1, IS2, transistors T5, T6 and a capacitor C2. The one-shot circuit 3211 has an input terminal and an output terminal, wherein the input terminal is coupled to the control circuit to receive the control signal CTRL. The flip-flop FF1 has a clock input terminal, a data input terminal and an output terminal, wherein the clock input terminal is coupled to the output terminal of the one-shot circuit 3211, the data input terminal is coupled to the control circuit to receive the control signal CTRL, the output terminal is configured to provide an on-time detection signal DEC. The logic circuit 3212 has an input terminal, a first output terminal and a second output terminal, wherein the input terminal is coupled to the output terminal of the flip-flop FF1 to receive the on-time detection signal DEC, and wherein based on the on-time detection signal DEC, the logic circuit 3212 generates logic signals LOG1 and LOG2 respectively at the first output terminal and the second output terminal. The current source IS1 has a first terminal and a second terminal, wherein the first terminal is coupled to the power supply voltage Vcc. The transistor T5 has a first terminal, a second terminal and a control terminal, wherein the first terminal is coupled to the second terminal of the current source IS1, and the control terminal is coupled to the first output terminal of the logic circuit 3212 to receive the logic signal LOG1. The transistor T6 has a first terminal, a second terminal and a control terminal, wherein the first terminal is coupled to the second terminal of the transistor T5, and the control terminal is coupled to the second output terminal of the logic circuit 3212 to receive the logic signal LOG2. The current source IS2 has a first terminal and a second terminal, wherein the first terminal is coupled to the second terminal of the transistor T6, the second terminal is coupled to the reference ground. The capacitor C2 has a first terminal and a second terminal, wherein the first terminal is coupled to the second terminal of the transistor T5 and the first terminal of the transistor T6, and is configured to provide the first current control signal CCS1, the second terminal is coupled to the reference ground.

The controllable current source 222B includes a current mirror 3213, a transistor T7, a resistor R2 and a current source IS3. The transistor T7 has a first terminal, a second terminal and a control terminal, wherein the control terminal is coupled to the first current control circuit 221B to receive the first current control signal CCS1. The resistor R2 has a first terminal and a second terminal, wherein the first terminal is coupled to the second terminal of the transistor T7. The current source IS3 has a first terminal and a second terminal, wherein the first terminal is coupled to the second terminal of the resistor R2, the second terminal is coupled to the reference ground. The current mirror 3212 includes transistors T8 and T9. It has a power supply terminal, a first terminal and a second terminal, wherein the power supply terminal is coupled to the power supply voltage Vcc, the first terminal is coupled to the first terminal of the transistor T7, the second terminal is configured to provide the current I1.

When the control signal CTRL changes from logical low into logical high, the one-shot circuit 3211 is triggered to generate a pulse signal which has a pulse width equal to the time threshold Tth. At the falling edge of the pulse signal, the flip-flop FF1 is triggered to provide the signal at its data input terminal to the output terminal. If the on-time Ton of the main transistor is smaller than the time threshold, the on-time detection signal DEC output by the flip-flop FF1 would be logical low. Under the control of the logic circuit 3212, the transistor T6 turns off and the transistor T5 turns on for a time period to let the current source IS1 charge the capacitor C2. The first current control signal CCS1 which is equal to the voltage across the capacitor C2 goes up. When the first current control signal CCS1 becomes larger than the threshold voltage of the transistor T7, the current I1 generated by the current mirror 3123 would be larger than zero and vary along with the first current control signal CCS1. Specifically speaking, the maximum value of the current I1 is determined by the current source IS3.

If the on-time Ton of the main transistor is larger than the time threshold, the on-time detection signal DEC output by the flip-flop FF1 would be logical high. Under the control of the logic circuit 3212, the transistor T5 turns off and the transistor T6 turns on for a time period to let the current source IS2 discharge the capacitor C2. The current I1 generated by the current mirror 3123 as well as the first current control signal CCS1 goes down. When the first current control signal CCS1 becomes smaller than the threshold voltage of the transistor T7, the current I1 would be zero and the clock frequency fclk would resume to the constant value mentioned before.

In one embodiment, the first current control circuit 221B further comprises a fast startup circuit including a current source IS4, transistors T10~T12 and a multi detection circuit 3214. The current source IS4 has a first terminal and a second terminal, wherein the first terminal is coupled to the power supply voltage Vcc. The transistor T10 has a first terminal, a second terminal and a control terminal, wherein the first terminal is coupled to the power supply voltage Vcc, the second terminal is coupled to the first terminal of the capacitor C2, the control terminal is coupled to the second terminal of the current source IS4. The transistor T11 has a first terminal, a second terminal and a control terminal, wherein the first terminal is coupled to the control terminal of the transistor T10, the second terminal is coupled to the reference ground, the control terminal is coupled to the first terminal of the capacitor C2. The multi detection circuit 3214 is coupled to the output terminal of the flip-flop FF1 to receive the on-time detection signal DEC, wherein based on the on-time detection signal DEC, the multi detection circuit 3214 determines whether the on-time Ton of the main transistor is smaller than the time threshold Tth in a plurality of successive switching cycles, and generates a multi detection signal MTD. The transistor T12 has a first terminal, a second terminal and a control terminal, wherein the first terminal is coupled to the control terminal of the transistor T10, the second terminal is coupled to the reference ground, and the control terminal is coupled to the multi detection circuit 3214 to receive the multi detection signal MTD.

In normal operation, the transistor T12 is on and the transistor T10 is off. The fast startup circuit does not work. When the multi detection circuit 3214 detects the on-time Ton of the main transistor is smaller than the time threshold in a plurality of successive switching cycles, the transistor T12 turns off and the fast startup circuit starts to work. The capacitor C2 is charged by the power supply voltage Vcc through the transistor T10 until the current flowing through the transistor T11 becomes equal to the current provided by the current source IS4.

Figure 4:
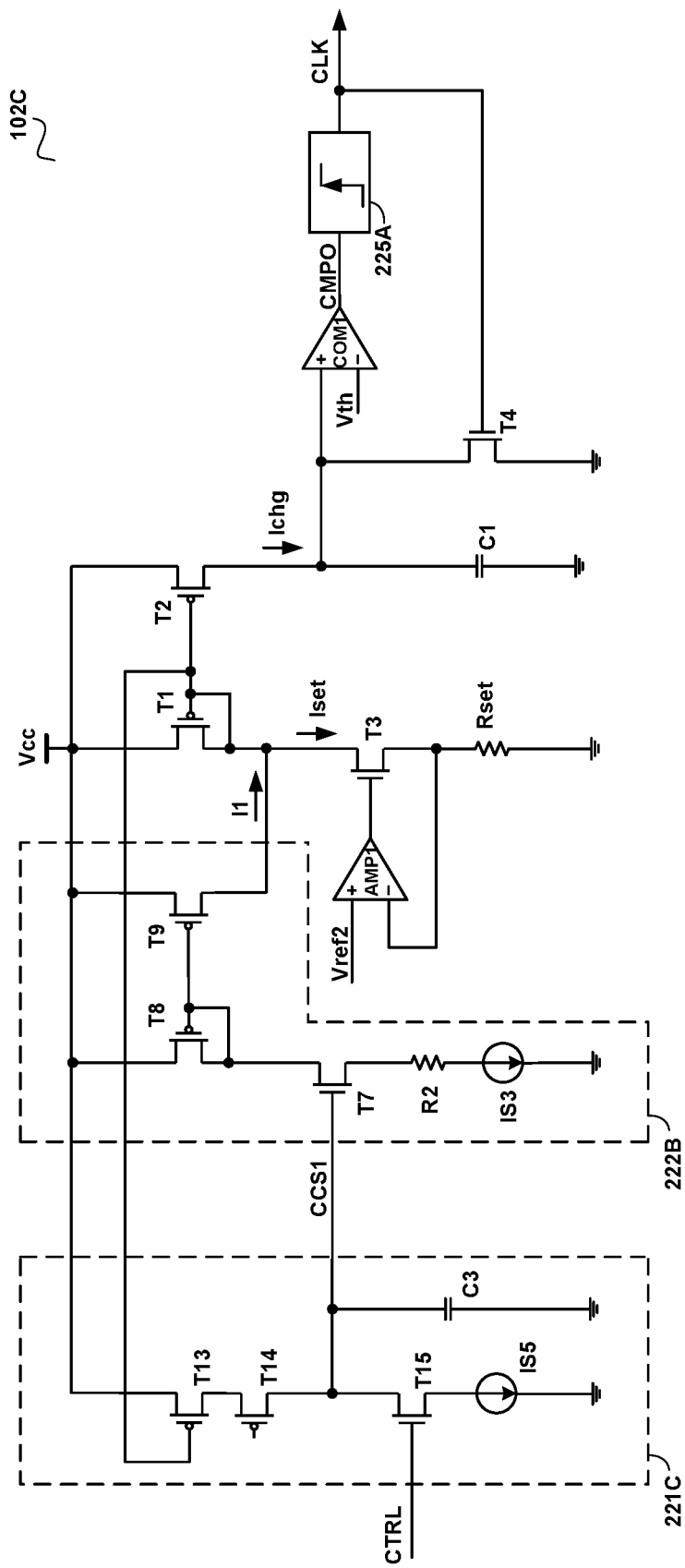
FIG. 4 schematically illustrates a clock generator 102C in accordance with an embodiment of the present invention.

FIG. 4 schematically illustrates a clock generator 102C in accordance with an embodiment of the present invention, wherein the first current control circuit 221C comprises transistors T13~T15, a current source IS5 and a capacitor C3. The transistor T13 has a first terminal, a second terminal and a control terminal, wherein the first terminal is coupled to the power supply voltage Vcc, the control terminal is coupled to the control terminals of the transistors T1 and T2. The transistor T14 has a first terminal, a second terminal and a control terminal, wherein the first terminal is coupled to the second terminal of the transistor T13. The transistor T15 has a first terminal, a second terminal and a control terminal, wherein the first terminal is coupled to the second terminal of the transistor T14, the control terminal is coupled to the control circuit to receive the control signal CTRL. The current source IS5 has a first terminal and a second terminal, wherein the first terminal is coupled to the second terminal of the transistor T15, the second terminal is coupled to the reference ground. The capacitor C3 has a first terminal and a second terminal, wherein the first terminal is coupled to the second terminal of the transistor T14 and the first terminal of the transistor T15, and is configured to provide the first current control signal CCS1, the second terminal is coupled to the reference ground.

The transistor T14 is maintained on in current continuous mode. The transistor T15 turns on when the main transistor is on and turns off when the main transistor is off. Based on the configuration shown in FIG. 4, the time threshold Tth can be expressed as:

$$T_{th} = \frac{I_{chg}}{I_{s5} \times f_{clk}} \quad (1.4)$$

When the on-time Ton of the main transistor is larger than the time threshold Tth as shown in the equation (1.4), the first current control signal CCS1 which is equal to the voltage across the capacitor C3 would be lower than the threshold voltage of the transistor T7. Thus the transistor T7 turns off and the current I1 is zero. When the on-time Ton is smaller than the time threshold Tth, the first current control signal CCS1 would increase to be higher than the threshold voltage of the transistor T7. Consequently, the transistor T7 turns on and the current I1 becomes larger than zero.

Figure 5:
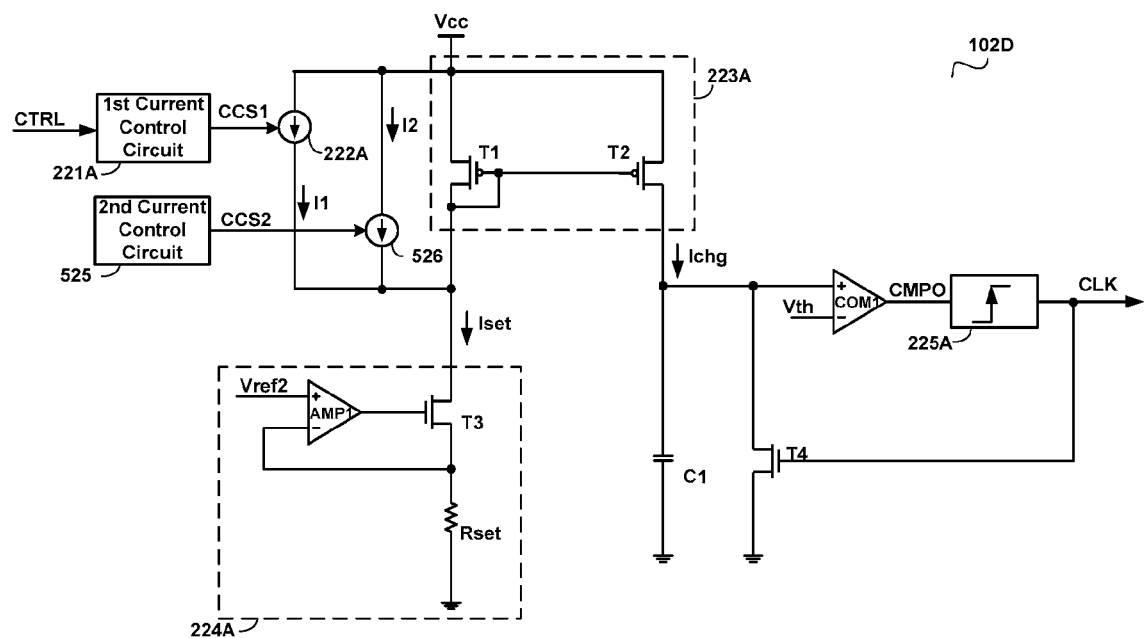
FIG. 5 schematically illustrates a clock generator 102D in accordance with an embodiment of the present invention.

FIG. 5 schematically illustrates a clock generator 102D in accordance with an embodiment of the present invention. Compared with the clock generator 102A shown in FIG. 2, the clock generator 103D of FIG. 5 further comprises a second current control circuit 525 and a controllable current source 526. The second current control circuit 525 is configured to detect whether the switching converter works under a light load condition and generate a second current control signal CCS2. The controllable current source 525 has a first terminal, a second terminal and a control terminal, wherein the first terminal is coupled to the power supply voltage Vcc, the second terminal is coupled to the first terminal of the current mirror 223A to provide a current I2, the control terminal is coupled to the second current control circuit 525 to receive the second current control signal CCS2. Therefore, the current Ichg generated by the current mirror 223A can be expressed as:

$$I_{chg}=I_{set}-I_1-I_2 \quad (1.5)$$

If the second current control circuit 525 detects that the switching converter does not work under the light load condition, the current I2 output by the controllable current source 526 will be zero. Otherwise, if the second current control circuit 525 detects that the switching converter works under the light load condition, which means the output current or output power of the switching converter is lower than a predetermined value, the current I2 output by the controllable current source 526 will be larger than zero. The clock frequency fclk as well as the current Ichg will decrease, which definitely lowers the switching loss of the switching converter and improves the light load efficiency.

Figure 6:
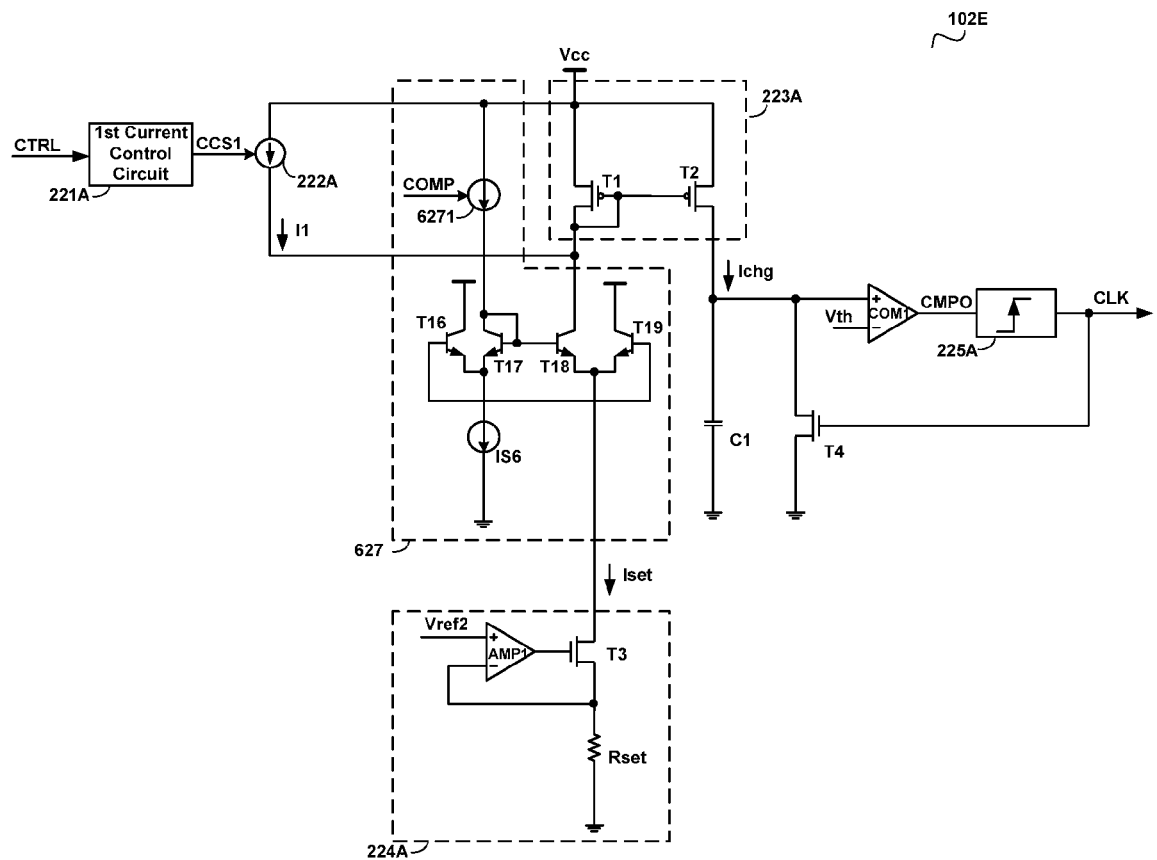
FIG. 6 schematically illustrates a clock generator 102E in accordance with an embodiment of the present invention.

The function of the second current control circuit 525 and the controllable current source 526 can be realized by a circuit 627 shown in FIG. 6. The circuit 627 includes a controllable current source 6271, transistors T16~T19 and a current source IS6. The controllable current source 6271 has a first terminal, a second terminal and a control terminal, wherein the first terminal is coupled to the power supply voltage Vcc, the control terminal is coupled to the error amplifying circuit to receive the compensation signal COMP. The controllable current source 6271 provides a current Icomp determined by the compensation signal COMP. The transistor T16 has a first terminal, a second terminal and a control terminal, wherein the first terminal is coupled to the power supply voltage Vcc, the second terminal is coupled to the reference ground. The transistor T17 has a first terminal, a second terminal and a control terminal, wherein the first terminal and the control terminal are coupled to the second terminal of the controllable current source 6271. The transistor T18 has a first terminal, a second terminal and a control terminal, wherein the first terminal is coupled to the first terminal of the current mirror 223A, the second terminal is coupled to the frequency setting circuit 224A, the control terminal is coupled to the control terminal of the transistor T17. The transistor T19 has a first terminal, a second terminal and a control terminal, wherein the first terminal is coupled to the power supply voltage Vcc, the second terminal is coupled to the frequency setting circuit 224A, the control terminal is coupled to the control terminal of the transistor T16. The current source IS6 has a first terminal and a second terminal, wherein the first terminal is coupled to the second terminals of the transistors T16 and T17, the second terminal is coupled to the reference ground.

Based on the configuration described above, it can be derived that:

$$I_{16} + I_{17} = I_{s6} \quad (1.6)$$

$$I_{18} + I_{19} = I_{set} \quad (1.7)$$

$$I_{16} \times I_{18} = I_{17} \times I_{19} \quad (1.8)$$

$$I_{17} = I_{comp} \quad (1.9)$$

$$I_{chg} = I_{18} - I_1 \quad (1.10)$$

Wherein I16~I19 respectively represent the current flowing through the transistors T16~T19.

When the switching converter does not works under the light load condition, the current Icomp output by the controllable current source 6271 is larger than the current provided by the current source IS6. The current I16 flowing through the transistor T16 and the current I19 flowing through the transistor T19 are both zero. Then just as shown in the equation (1.1), the current Ichg generated by the current mirror 223A would not be affected by the circuit 627.

When the switching converter works under light load condition, the current Icomp becomes smaller than the current provided by the current source IS6. The current Ichg generated by the current mirror 223A can be expressed as:

$$I_{chg} = \frac{I_{comp} \times I_{set}}{I_{s6}} - I_1 \quad (1.11)$$

It can be seen from the equation (1.11) that, the lighter the load, the smaller the compensation signal COMP, thus the lower the current Ichg and the clock frequency fclk.

Figure 7:
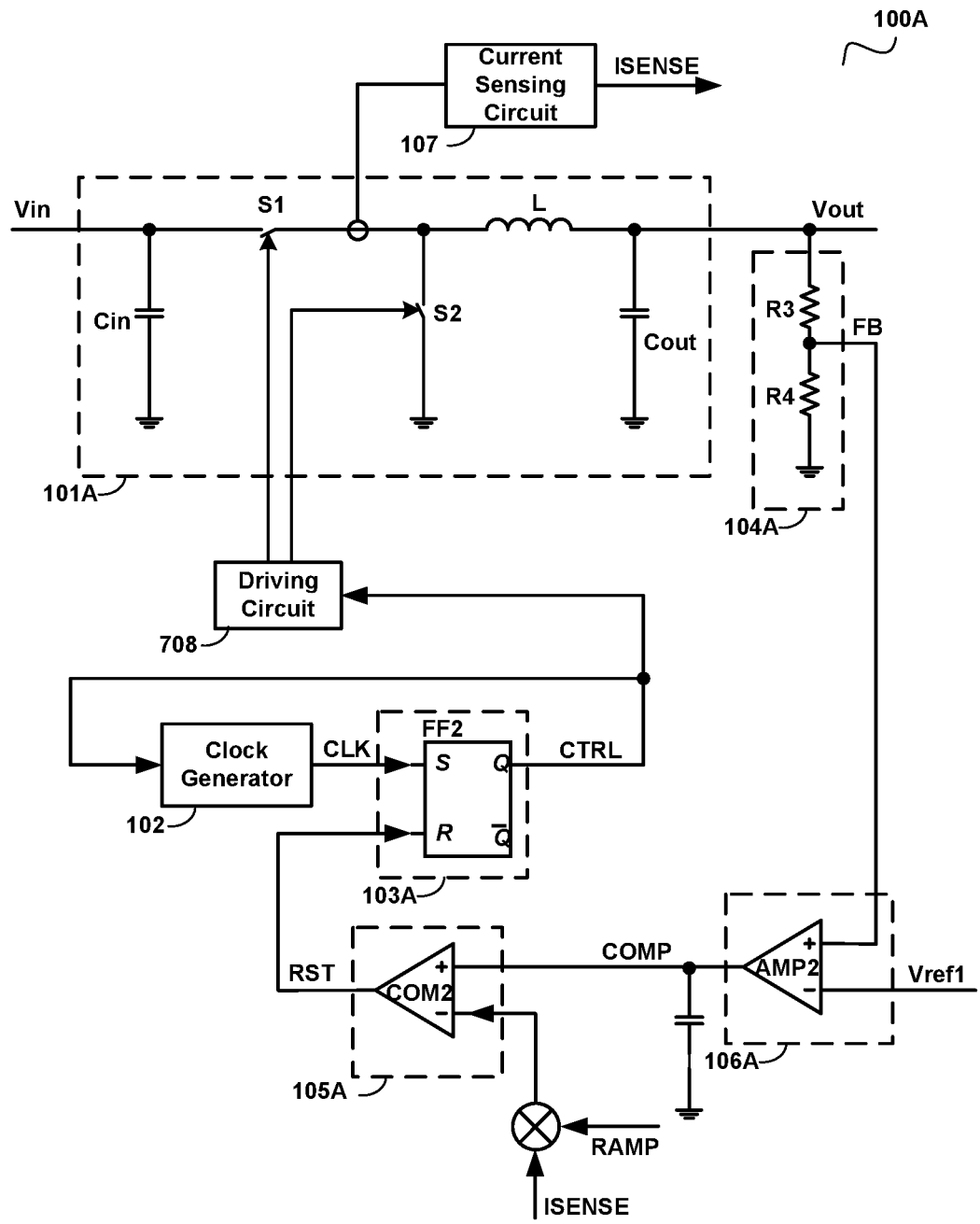
FIG. 7 schematically illustrates a switching converter 100A in accordance with an embodiment of the present invention.

FIG. 7 schematically illustrates a switching converter 100A in accordance with an embodiment of the present invention. The switching circuit 101A is a synchronous BUCK circuit consisting of an input capacitor Cin, transistors S1, S2, an inductor L and an output capacitor Cout, connected as shown in FIG. 7. The feedback circuit 104A comprises a resistor divider composed of resistors R3 and R4. The error amplifying circuit 106A contains an error amplifier AMP2. The comparing circuit 105A involves a comparator COM2 which compares a sum of the current sensing signal ISENSE and a ramp signal RAMP with the compensation signal COMP and generates the reset signal RST. The control circuit 103A includes a flip-flop FF2 having a set terminal, a reset terminal and an output terminal, wherein the set terminal is coupled to the clock generator 102 to receive the clock signal CLK, the reset terminal is coupled to the comparing circuit 105A to receive the reset signal RST, the output terminal is configured to provide the control signal CTRL which controls the transistors S1 and S2 through a driving circuit 708.

Although the embodiments shown in FIG. 1 and FIG. 7 both utilize the peak current control method, people of ordinary skill in the art can recognize that the error amplifying circuit, current sensing circuit and comparing circuit are not necessary, and the present invention can be applied to other suitable control schemes, e.g. single loop PWM control. Furthermore, in the embodiments described above, the output current of the current mirror is equal to the input current. But it can be understood that this does not intend to limit the present invention, and the output current of the current mirror can also be proportional to the input current.

Figure 8:
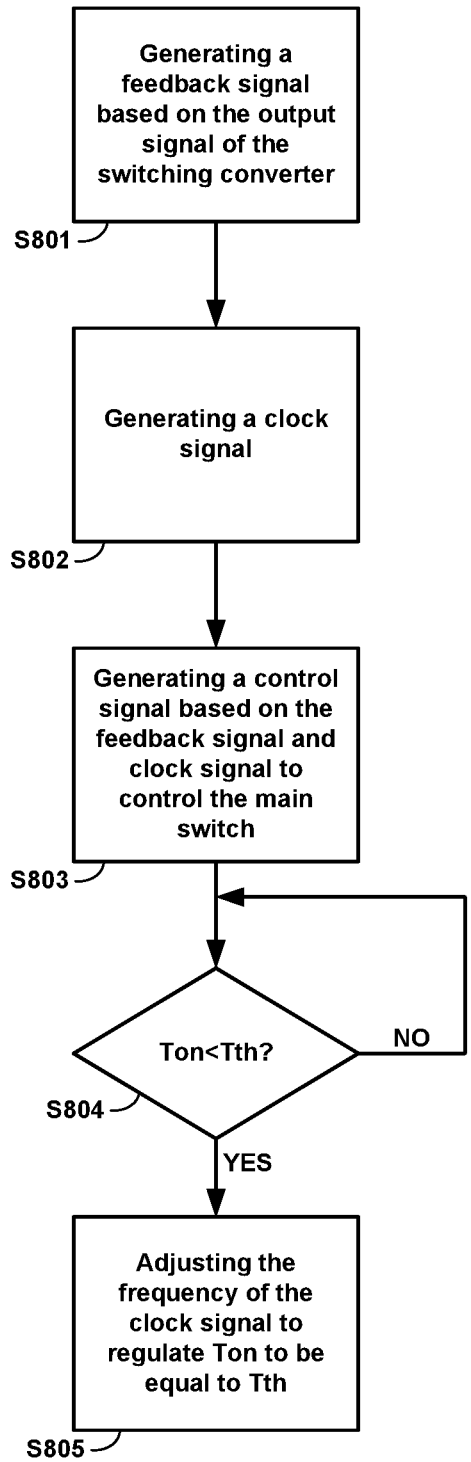
FIG. 8 is a flow chart of a control method for switching converters in accordance with an embodiment of the present invention.

FIG. 8 is a flow chart of a control method for switching converters in accordance with an embodiment of the present invention. It comprises steps S801~S805.

At step S801, a feedback signal indicative of the output signal of the switching converter is generated.

At step S802, a clock signal configured to determine the switching frequency of the main transistor is generated.

At step S803, a control signal is generated to control the main transistor based on the clock signal and the feedback signal.

At step S804, whether the on-time of the main transistor Ton is smaller than a time threshold Tth is detected based on the control signal. If the on-time Ton is smaller than the time threshold Tth, proceed to step S805, otherwise, keep detecting.

At step S805, the frequency of the clock signal is adjusted to regulate the on-time Ton to be equal to the time threshold Tth.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A switching converter, comprising:
   a switching circuit having a main transistor, wherein the switching circuit is configured to convert an input voltage into an output voltage;

a feedback circuit coupled to the switching circuit, wherein the feedback circuit is configured to generate a feedback signal indicative of the output voltage;

a current sensing circuit configured to sense the current flowing through the main transistor and generate a current sensing signal;

a clock generator configured to generate a clock signal;

an error amplifying circuit coupled to the feedback circuit, wherein based on the difference between a first reference voltage and the feedback signal, the error amplifying circuit generates a compensation signal;

a comparing circuit coupled to the current sensing circuit and the error amplifying circuit, wherein the comparing circuit compares the current sensing signal with the compensation signal and generates a reset signal; and a control circuit coupled to the clock generator and the comparing circuit, wherein based on the clock signal and the reset signal, the control circuit generates a control signal to control the main transistor; wherein the clock generator is coupled to the control circuit to receive the control signal and detect whether the on-time of the main transistor is smaller than a time threshold based on the control signal, and wherein if the on-time of the main transistor is smaller than the time threshold, the clock generator will adjust the frequency of the clock signal to regulate the on-time of the main transistor to be equal to the time threshold.

2. The switching converter of claim 1, wherein the clock generator adjusts the frequency of the clock signal only when the on-time of the main transistor is smaller than the time threshold in a plurality of successive switching cycles.

3. The switching converter of claim 1, wherein the clock generator comprises:

a first current control circuit having an input terminal and an output terminal, wherein the input terminal is coupled to the control circuit to receive the control signal, and wherein based on the control signal, the first current control circuit detects whether the on-time of the main transistor is smaller than the time threshold, and generates a first current control signal at the output terminal;

a first controllable current source having a first terminal, a second terminal and a control terminal, wherein the first terminal is coupled to a power supply voltage, the control terminal is coupled to the output terminal of the first current control circuit;

a frequency setting circuit configured to provide a setting current;

a first current mirror including a first transistor and a second transistor, wherein the first current mirror has a power supply terminal, a first terminal and a second terminal, and wherein the power supply terminal is coupled to the power supply voltage, the first terminal is coupled to the frequency setting circuit and the second terminal of the first controllable current source;

a first capacitor having a first terminal and a second terminal, wherein the first terminal is coupled to the second terminal of the first current mirror, the second terminal is coupled to a reference ground;

a fourth transistor having a first terminal, a second terminal and a control terminal, wherein the first terminal is coupled to the first terminal of the first capacitor, the second terminal is coupled to the reference ground;

a comparator having a first input terminal, a second input terminal and an output terminal, wherein the first input terminal is coupled to the first terminal of the first capacitor, the second input terminal is configured to receive a threshold voltage; and a first one-shot circuit having an input terminal and an output terminal, wherein the input terminal is coupled to the output terminal of the comparator, the output terminal is coupled to the control terminal of the fourth transistor and is configured to provide the clock signal.

4. The switching converter of claim 3, wherein the frequency setting circuit comprises:

a third transistor having a first terminal, a second terminal and a control terminal, wherein the first terminal is coupled to the second terminal of the first controllable current source and the first terminal of the first current mirror;

an operational amplifier having a first input terminal, a second input terminal and an output terminal, wherein the first input terminal is configured to receive a second reference voltage, the second input terminal is coupled to the second terminal of the third transistor, the output terminal is coupled to the control terminal of the third transistor; and a first resistor having a first terminal and a second terminal, wherein the first terminal is coupled to the second terminal of the third transistor, the second terminal is coupled to the reference ground.

5. The switching converter of claim 3, wherein the first current control circuit comprises:

a second one-shot circuit having an input terminal and an output terminal, wherein the input terminal is coupled to the control circuit to receive the control signal;

a flip-flop having a clock input terminal, a data input terminal and an output terminal, wherein the clock input terminal is coupled to the output terminal of the second one-shot circuit, the data input terminal is coupled to the control circuit to receive the control signal, the output terminal is configured to provide an on-time detection signal;

a logic circuit having an input terminal, a first output terminal and a second output terminal, wherein the input terminal is coupled to the output terminal of the flip-flop, and wherein based on the on-time detection signal, the logic circuit generates a first logic signal and a second logic signal respectively at the first output terminal and the second output terminal;

a first current source having a first terminal and a second terminal, wherein the first terminal is coupled to the power supply voltage;

a fifth transistor having a first terminal, a second terminal and a control terminal, wherein the first terminal is coupled to the second terminal of the first current source, the control terminal is coupled to the first output terminal of the logic circuit to receive the first logic signal;

a sixth transistor having a first terminal, a second terminal and a control terminal, wherein the first terminal is coupled to the second terminal of the fifth transistor, the control terminal is coupled to the second output terminal of the logic circuit to receive the second logic signal;

a second current source having a first terminal and a second terminal, wherein the first terminal is coupled to the second terminal of the sixth transistor, the second terminal is coupled to the reference ground; and a second capacitor having a first terminal and a second terminal, wherein the first terminal is coupled to the second terminal of the fifth transistor and the first terminal of the sixth transistor, and is configured to provide the first current control signal, the second terminal is coupled to the reference ground.

6. The switching converter of claim 3, wherein the first controllable current source comprises:
   a seventh transistor having a first terminal, a second terminal and a control terminal, wherein the control terminal is coupled to the first current control circuit to receive the first current control signal;
   a second resistor having a first terminal and a second terminal, wherein the first terminal is coupled to the second terminal of the seventh transistor;
   a third current source having a first terminal and a second terminal, wherein the first terminal is coupled to the second terminal of the second resistor, the second terminal is coupled to the reference ground; and
   a second current mirror including an eighth transistor and a ninth transistor, wherein the second current mirror has a power supply terminal, a first terminal and a second terminal, wherein the power supply terminal is coupled to the power supply voltage, the first terminal is coupled to the first terminal of the seventh transistor, the second terminal is coupled to the first terminal of the first current mirror.

7. The switching converter of claim 5, wherein the first current control circuit further comprises:
   a fourth current source having a first terminal and a second terminal, wherein the first terminal is coupled to the power supply voltage;
   a tenth transistor having a first terminal, a second terminal and a control terminal, wherein the first terminal is coupled to the power supply voltage, the second terminal is coupled to the first terminal of the second capacitor, the control terminal is coupled to the second terminal of the fourth current source;
   an eleventh transistor having a first terminal, a second terminal and a control terminal, wherein the first terminal is coupled to the control terminal of the tenth transistor, the second terminal is coupled to the reference ground, the control terminal is coupled to the first terminal of the second capacitor;
   a multi detection circuit coupled to the output terminal of the flip-flop, wherein based on the on-time detection signal, the multi detection circuit determines whether the on-time of the main transistor is smaller than the time threshold in a plurality of successive switching cycles, and generates a multi detection signal; and
   a twelfth transistor having a first terminal, a second terminal and a control terminal, wherein the first terminal is coupled to the control terminal of the tenth transistor, the second terminal is coupled to the reference ground, and the control terminal is coupled to the multi detection circuit to receive the multi detection signal.

8. The switching converter of claim 3, wherein the first current control circuit comprises:
   a thirteenth transistor having a first terminal, a second terminal and a control terminal, wherein the first terminal is coupled to the power supply voltage, the control terminal is coupled to the control terminals of the first transistor and the second transistor;
   a fourteenth transistor having a first terminal, a second terminal and a control terminal, wherein the first terminal is coupled to the second terminal of the thirteenth transistor;
   a fifteenth transistor having a first terminal, a second terminal and a control terminal, wherein the first terminal is coupled to the second terminal of the fourteenth transistor, the control terminal is coupled to the control circuit to receive the control signal;
   a fifth current source having a first terminal and a second terminal, wherein the first terminal is coupled to the second terminal of the fifteenth transistor, the second terminal is coupled to the reference ground; and
   a third capacitor having a first terminal and a second terminal, wherein the first terminal is coupled to the second terminal of the fourteenth transistor and the first terminal of the fifteenth transistor, and is configured to provide the first current control signal, the second terminal is coupled to the reference ground.

9. The switching converter of claim 3, wherein the clock generator further comprises:
   a second current control circuit configured to detect whether the switching converter works under a light load condition and generate a second current control signal; and
   a second controllable current source having a first terminal, a second terminal and a control terminal, wherein the first terminal is coupled to the power supply voltage, the second terminal is coupled to the first terminal of the first current mirror, the control terminal is coupled to the second current control circuit to receive the second current control signal.

10. The switching converter of claim 3, wherein the clock generator further comprises:
    a third controllable current source having a first terminal, a second terminal and a control terminal, wherein the first terminal is coupled to the power supply voltage, the control terminal is coupled to the error amplifying circuit to receive the compensation signal;
    a sixteenth transistor having a first terminal, a second terminal and a control terminal, wherein the first terminal is coupled to the power supply voltage, the second terminal is coupled to the reference ground;
    a seventeenth transistor having a first terminal, a second terminal and a control terminal, wherein the first terminal and the control terminal are coupled to the second terminal of the third controllable current source;
    an eighteenth transistor having a first terminal, a second terminal and a control terminal, wherein the first terminal is coupled to the first terminal of the first current mirror, the second terminal is coupled to the frequency setting circuit, the control terminal is coupled to the control terminal of the seventeenth transistor;
    a nineteenth transistor having a first terminal, a second terminal and a control terminal, wherein the first terminal is coupled to the power supply voltage, the second terminal is coupled to the frequency setting circuit, the control terminal is coupled to the control terminal of the sixteenth transistor; and
    a sixth current source having a first terminal and a second terminal, wherein the first terminal is coupled to the second terminals of the sixteenth transistor and the seventeenth transistor, the second terminal is coupled to the reference ground.

11. A controller used in a switching converter, wherein the switching converter has a main transistor and is configured to provide an output signal, the controller comprises:
    a clock generator configured to generate a clock signal to determine the switching frequency of the main transistor; and
    a control circuit coupled to the clock generator, wherein based on the clock signal and a feedback signal indicative of the output signal of the switching converter, the control circuit generates a control signal to control the main transistor; wherein if the on-time of the main transistor is smaller than a time threshold, the clock generator will adjust the frequency of the clock signal to regulate the on-time of the main transistor to be equal to the time threshold; and wherein the clock generator comprises:
  a first current control circuit having an input terminal and an output terminal, wherein the input terminal is coupled to the control circuit to receive the control signal, and wherein based on the control signal, the first current control circuit detects whether the on-time of the main transistor is smaller than the time threshold, and generates a first current control signal at the output terminal;
  a first controllable current source having a first terminal, a second terminal and a control terminal, wherein the first terminal is coupled to a power supply voltage, the control terminal is coupled to the output terminal of the first current control circuit;
  a frequency setting circuit configured to provide a setting current;
  a first current mirror including a first transistor and a second transistor, wherein the first current mirror has a power supply terminal, a first terminal and a second terminal, and wherein the power supply terminal is coupled to the power supply voltage, the first terminal is coupled to the frequency setting circuit and the second terminal of the first controllable current source;
  a first capacitor having a first terminal and a second terminal, wherein the first terminal is coupled to the second terminal of the first current mirror, the second terminal is coupled to a reference ground;
  a fourth transistor having a first terminal, a second terminal and a control terminal, wherein the first terminal is coupled to the first terminal of the first capacitor, the second terminal is coupled to the reference ground;
  a comparator having a first input terminal, a second input terminal and an output terminal, wherein the first input terminal is coupled to the first terminal of the first capacitor, the second input terminal is configured to receive a threshold voltage; and
  a first one-shot circuit having an input terminal and an output terminal, wherein the input terminal is coupled to the output terminal of the comparator, the output terminal is coupled to the control terminal of the fourth transistor and is configured to provide the clock signal.

12. The controller of claim 11, wherein the frequency setting circuit comprises:
  a third transistor having a first terminal, a second terminal and a control terminal, wherein the first terminal is coupled to the second terminal of the first controllable current source and the first terminal of the first current mirror;
  an operational amplifier having a first input terminal, a second input terminal and an output terminal, wherein the first input terminal is configured to receive a reference voltage, the second input terminal is coupled to the second terminal of the third transistor, the output terminal is coupled to the control terminal of the third transistor; and
  a first resistor having a first terminal and a second terminal, wherein the first terminal is coupled to the second terminal of the third transistor, the second terminal is coupled to the reference ground.

13. The controller of claim 11, wherein the first current control circuit comprises:
  a second one-shot circuit having an input terminal and an output terminal, wherein the input terminal is coupled to the control circuit to receive the control signal;
  a flip-flop having a clock input terminal, a data input terminal and an output terminal, wherein the clock input terminal is coupled to the output terminal of the second one-shot circuit, the data input terminal is coupled to the control circuit to receive the control signal, the output terminal is configured to provide an on-time detection signal;
  a logic circuit having an input terminal, a first output terminal and a second output terminal, wherein the input terminal is coupled to the output terminal of the flip-flop, and wherein based on the on-time detection signal, the logic circuit generates a first logic signal and a second logic signal respectively at the first output terminal and the second output terminal;
  a first current source having a first terminal and a second terminal, wherein the first terminal is coupled to the power supply voltage;
  a fifth transistor having a first terminal, a second terminal and a control terminal, wherein the first terminal is coupled to the second terminal of the first current source, the control terminal is coupled to the first output terminal of the logic circuit to receive the first logic signal;
  a sixth transistor having a first terminal, a second terminal and a control terminal, wherein the first terminal is coupled to the second terminal of the fifth transistor, the control terminal is coupled to the second output terminal of the logic circuit to receive the second logic signal;
  a second current source having a first terminal and a second terminal, wherein the first terminal is coupled to the second terminal of the sixth transistor, the second terminal is coupled to the reference ground; and
  a second capacitor having a first terminal and a second terminal, wherein the first terminal is coupled to the second terminal of the fifth transistor and the first terminal of the sixth transistor, and is configured to provide the first current control signal, the second terminal is coupled to the reference ground.

14. The controller of claim 11, wherein the first controllable current source comprises:
  a seventh transistor having a first terminal, a second terminal and a control terminal, wherein the control terminal is coupled to the first current control circuit to receive the first current control signal;
  a second resistor having a first terminal and a second terminal, wherein the first terminal is coupled to the second terminal of the seventh transistor;
  a third current source having a first terminal and a second terminal, wherein the first terminal is coupled to the second terminal of the second resistor, the second terminal is coupled to the reference ground; and
  a second current mirror including an eighth transistor and a ninth transistor, wherein the second current mirror has a power supply terminal, a first terminal and a second terminal, wherein the power supply terminal is coupled to the power supply voltage, the first terminal is coupled to the first terminal of the seventh transistor, the second terminal is coupled to the first terminal of the first current mirror.

15. The controller of claim 13, wherein the first current control circuit further comprises:

a fourth current source having a first terminal and a second terminal, wherein the first terminal is coupled to the power supply voltage;

a tenth transistor having a first terminal, a second terminal and a control terminal, wherein the first terminal is coupled to the power supply voltage, the second terminal is coupled to the first terminal of the second capacitor, the control terminal is coupled to the second terminal of the fourth current source;

an eleventh transistor having a first terminal, a second terminal and a control terminal, wherein the first terminal is coupled to the control terminal of the tenth transistor, the second terminal is coupled to the reference ground, the control terminal is coupled to the first terminal of the second capacitor;

a multi detection circuit coupled to the output terminal of the flip-flop, wherein based on the on-time detection signal, the multi detection circuit determines whether the on-time of the main transistor is smaller than the time threshold in a plurality of successive switching cycles, and generates a multi detection signal; and a twelfth transistor having a first terminal, a second terminal and a control terminal, wherein the first terminal is coupled to the control terminal of the tenth transistor, the second terminal is coupled to the reference ground, and the control terminal is coupled to the multi detection circuit to receive the multi detection signal.

16. The controller of claim 11, wherein the first current control circuit comprises:

a thirteenth transistor having a first terminal, a second terminal and a control terminal, wherein the first terminal is coupled to the power supply voltage, the control terminal is coupled to the control terminals of the first transistor and the second transistor;

a fourteenth transistor having a first terminal, a second terminal and a control terminal, wherein the first terminal is coupled to the second terminal of the thirteenth transistor;

a fifteenth transistor having a first terminal, a second terminal and a control terminal, wherein the first terminal is coupled to the second terminal of the fourteenth transistor, the control terminal is coupled to the control circuit to receive the control signal;

a fifth current source having a first terminal and a second terminal, wherein the first terminal is coupled to the second terminal of the fifteenth transistor, the second terminal is coupled to the reference ground; and a third capacitor having a first terminal and a second terminal, wherein the first terminal is coupled to the second terminal of the fourteenth transistor and the first terminal of the fifteenth transistor, and is configured to provide the first current control signal, the second terminal is coupled to the reference ground.

17. The controller of claim 11, wherein the clock generator further comprises:

a second current control circuit configured to detect whether the switching converter works under light load condition and generate a second current control signal; and a second controllable current source having a first terminal, a second terminal and a control terminal, wherein the first terminal is coupled to the power supply voltage, the second terminal is coupled to the first terminal of the first current mirror, the control terminal is coupled to the second current control circuit to receive the second current control signal.

* * * * *